United States Patent

De Rooij et al.

Patent Number: 6,003,764

Date of Patent: *Dec. 21, 1999

[54] METHOD OF SECURELY STORING AND RETRIEVING MONETARY DATA

[75] Inventors: Peter Jacobus Nicolaas De Rooij; Antoon Wilfried Jan Bosselaers, both of Leuven, Belgium

[73] Assignee: Koninklijke Kpn N.V., Groningen, Netherlands

[*] Notice: This patent issued on a continued prosecution application filed under 37 CFR 1.53(d), and is subject to the twenty year patent term provisions of 35 U.S.C. 154(a)(2).

[21] Appl. No.: 08/799,627

[22] Filed: Feb. 12, 1997

[30] Foreign Application Priority Data

Feb. 12, 1996 [EP] European Pat. Off. .............. 96200324

[51] Int. Cl.$^6$ ..................................................... G06F 17/60
[52] U.S. Cl. ........................... 235/379; 235/380; 380/24; 902/26
[58] Field of Search ....................... 235/375, 379, 235/380; 902/3, 5, 26; 380/24, 25

[56] References Cited

U.S. PATENT DOCUMENTS

| | | | |
|---|---|---|---|
| 4,630,201 | 12/1986 | White | 364/408 |
| 4,799,061 | 1/1989 | Abraham et al. | 380/24 X |
| 4,825,050 | 4/1989 | Griffith et al. | 235/379 |
| 4,943,707 | 7/1990 | Boggan | 235/380 |
| 5,017,766 | 5/1991 | Tamada et al. | 235/492 |
| 5,221,838 | 6/1993 | Gutman et al. | 235/379 |
| 5,544,246 | 8/1996 | Mandelbaum et al. | 380/24 |
| 5,754,656 | 5/1998 | Nishioka et al. | 380/25 |
| 5,757,918 | 5/1998 | Hopkins | 380/25 |
| 5,799,085 | 8/1998 | Shona | 235/379 X |
| 5,825,882 | 10/1998 | Kowalski et al. | 235/380 X |
| 5,867,577 | 2/1999 | Patarin | 235/379 X |
| 5,884,292 | 3/1999 | Baker et al. | 235/375 X |
| 5,907,832 | 5/1999 | Pieterse et al. | 380/24 X |

FOREIGN PATENT DOCUMENTS

| | | |
|---|---|---|
| 0138219 | 4/1985 | European Pat. Off. . |
| 0546584 | 6/1993 | European Pat. Off. . |
| 0 623 903 A2 | 11/1994 | European Pat. Off. . |
| 0623903 | 11/1994 | European Pat. Off. . |
| WO9110214 | 7/1991 | WIPO . |
| WO9113411 | 9/1991 | WIPO . |

*Primary Examiner*—Michael G Lee
*Assistant Examiner*—Jared J. Fureman
*Attorney, Agent, or Firm*—Oblon, Spivak, McClelland, Maier & Neustadt, P.C.

[57] ABSTRACT

A method of securely storing and retrieving monetary values, such as electronic checks and electronic coins. In an interactive protocol between an issuer (e.g., a bank terminal) and a recipient (e.g., a smart card) of electronic money, authentication values (A, B, . . .) are produced by the issuer and are stored in an external storage device (e.g., an electronic wallet). At a later stage, the protocol is repeated between the recipient and the storage to securely retrieve the stored authentication values.

13 Claims, 3 Drawing Sheets

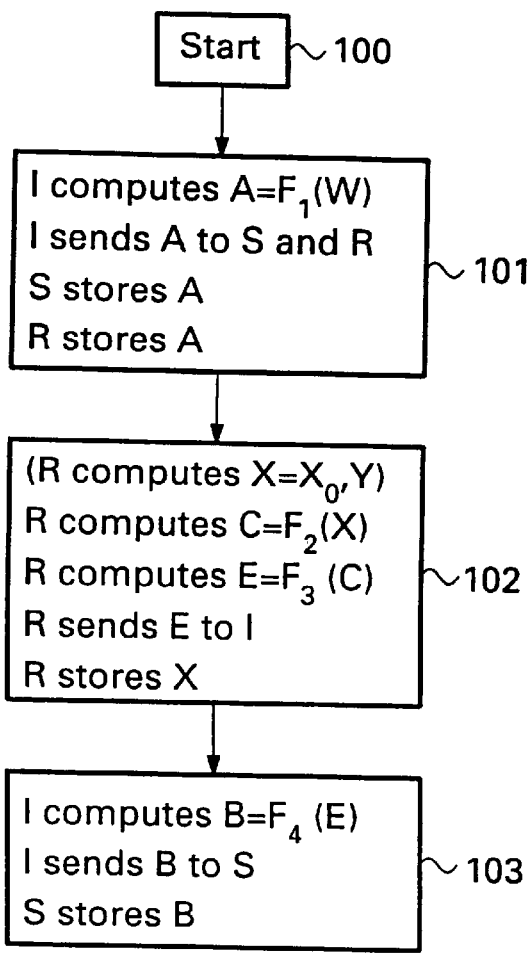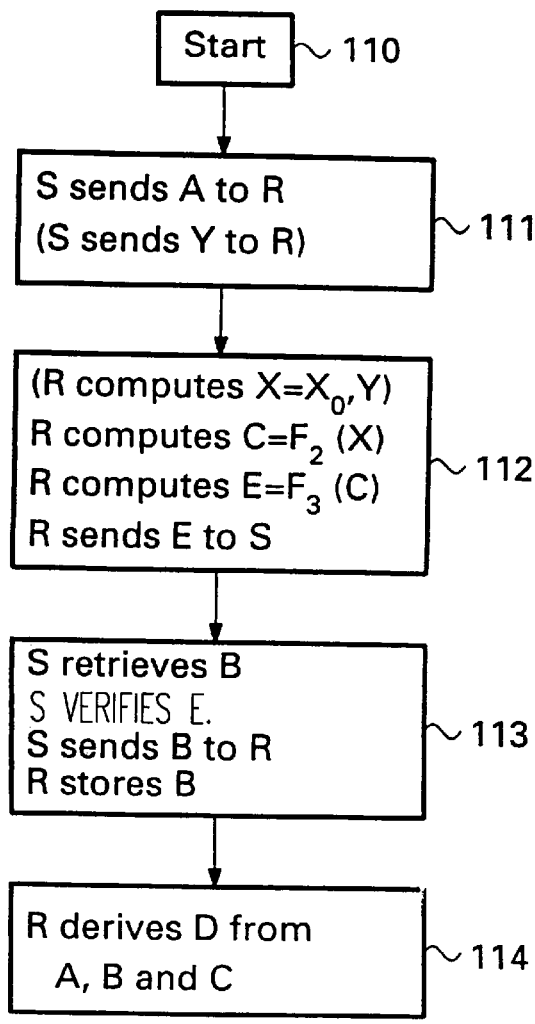
Fig. 4
Fig. 5

6,003,764

METHOD OF SECURELY STORING AND RETRIEVING MONETARY DATA

BACKGROUND OF THE INVENTION

1. Field of the Invention

The present invention relates to the storing and retrieving of monetary data. More specifically, the present invention relates to the storing of monetary data, such as data identifying electronic checks and electronic coins, in a storage medium, and to the later retrieval of the stored data by a means for electronic financial transactions, such as a smart card.

2. Discussion of the Background

Electronic checks and coins necessarily take up a fair amount of memory, as they include a variety of authentication data, such as a signature from a bank (issuer). Since the storage capacity of a smart card is usually limited, the need arises to store data externally while ensuring that the electronic money that is retrieved from storage can be trusted, i.e., that the data is valid. To accomplish this it is possible to arrange for use of an on-line protocol with the issuer each time data is loaded from storage. This is however time-consuming and often involves communications costs.

SUMMARY OF THE INVENTION

It is an object of the present invention to provide a method for safely storing and retrieving data, such as monetary data, in which the retrieval of data may be executed off-line. It is a further object of the present invention to provide a method which is independent of the specific type of data, such as electronic checks or coins. It is a still further object of the invention to provide a method in which the validity of monetary data may be derived from an interactive protocol.

To this end, the present invention provides a method of securely storing and retrieving data, the method comprising (1) a first phase including an interaction between an issuer and a recipient, in which data including authentication values are stored in the recipient and in a storage, and (2) a second phase including an interaction between the storage and the recipient, in which data is retrieved from the storage and is verified by the authentication values and at least one authentication value stored in the recipient.

By substantially repeating in the second phase the interaction of the first phase, a secure protocol may be achieved. The secure protocol effectively eliminates the possibility of loading incorrect monetary data, such as used or forged electronic checks, into the recipient.

Preferably, a first authentication value comprises a commitment produced by the issuer. Such a commitment, (e.g., an electronic signature), allows valid electronic money to be used.

Advantageously, in the second phase the storage verifies the authentication value received from the recipient.

The method of the present invention thus allows the validity of (monetary) data to be derived from an interactive protocol between an issuer and a recipient, but does not require an interaction with the issuer while retrieving stored data.

BRIEF DESCRIPTION OF THE DRAWINGS

FIG. 4 shows schematically a first phase of the method according to the present invention.

FIG. 5 shows schematically a second phase of the method according to the present invention.

DETAILED DESCRIPTION OF THE PREFERRED EMBODIMENTS

Figure 1:
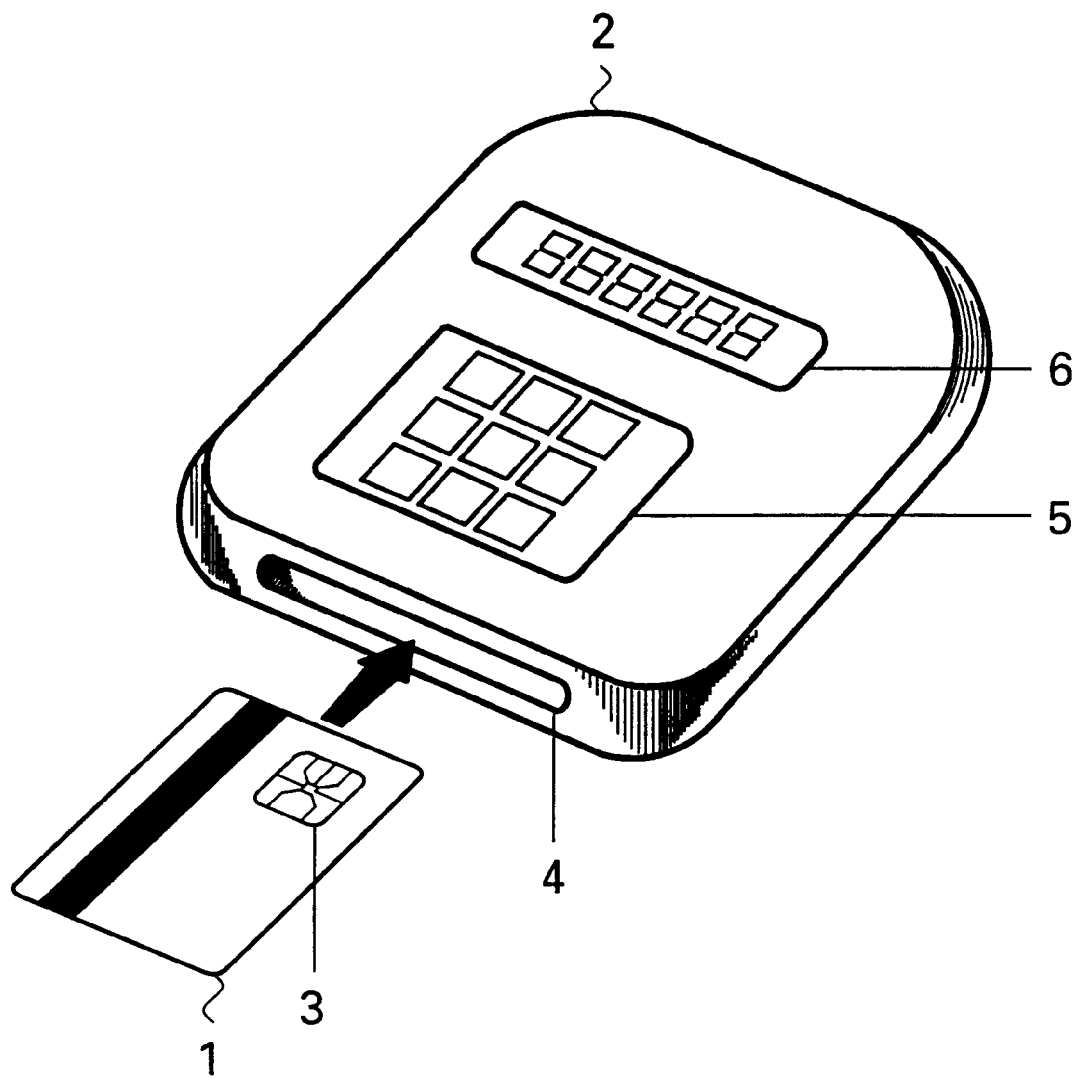
FIG. 1 shows schematically an IC card and an electronic wallet for interacting with the IC card.

An electronic wallet 2 shown in FIG. 1 is a device for interacting with an IC card 1. The wallet has a keyboard 5, a slot 4 for inserting the card 1, means for communicating with the inserted card via the card contacts 3, and means for communicating with an external terminal, such as a cash register (not shown). Such a terminal may comprise a card reader and/or an infra-red card interface for communicating with the card, preferably via the wallet. The terminal may further comprise means for establishing an on-line connection with a money issuing institution, such as a bank, and/or a secure module for securely storing monetary values or the like.

The wallet 2 allows a user to interact with the card 1 via a keyboard 5 and a display 6. The wallet 2 allows the user to perform electronic transactions e.g. check balances, transfer balances between accounts, authorize payments, and the like. The wallet also provides a storage for storing electronic checks, coins and the like, and thus acts as a storage extension for the card. The card 1 is provided with an integrated circuit (IC) arranged under the contacts 3. The integrated circuit may comprise a processor, a memory and I/O (input/output) means. As the memory size of present day smart cards is limited, a wallet may advantageously be used to store for later retrieval payment data which cannot be stored on the card.

Figure 2:
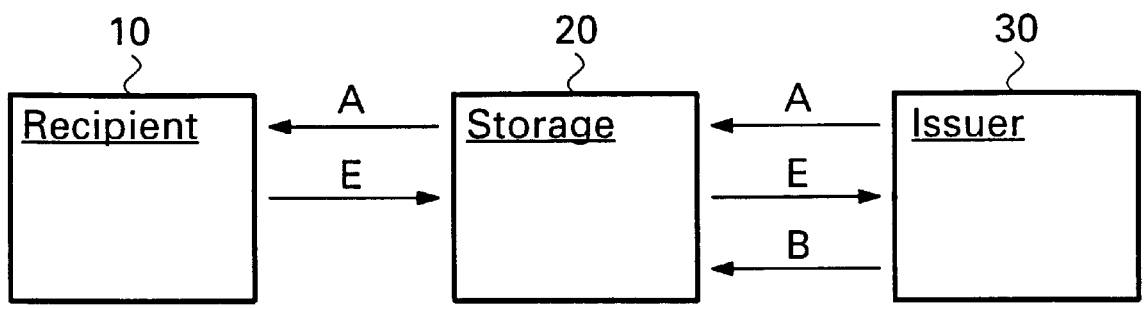
FIG. 2 shows schematically a system for electronic payments, as well as the exchange of data according to a first phase of the method of the present invention.

The system shown schematically and by way of example in FIG. 2 comprises a recipient 10, a storage 20 and an issuer 30. The recipient 10 and the storage 20 may correspond with the card 1 and the wallet 2 of FIG. 1 respectively. The issuer 30, which may be a bank or another monetary data providing institution, comprises a terminal suitable for interaction with the storage (wallet) 20.

In the following text, it will be assumed that the issuer (e.g. bank terminal) 30 issues electronic money, such as electronic checks and coins represented by suitable data, while the recipient (e.g. smart card) 10 receives the electronic money. The storage (wallet) 20 is used both as an intermediary between the issuer 30 and the recipient 10 and as a storage device for electronic money not stored on the card. It will be understood that the word "money" in this text is meant to comprise various representations of monetary and other values, and specifically comprises electronic checks and coins. In the following, the terms "monetary data" or just "data" will be used to indicate data related to "money", and especially data representing electronic checks and coins. However, the method of the present invention may also be applied to other data, such as confidential data.

Figure 3:
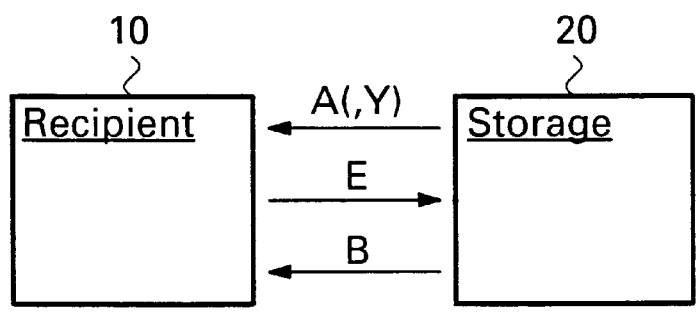
FIG. 3 shows schematically a system for electronic payments, as well as the exchange of data according to a second phase of the method of the present invention.

In the method of the invention, the issuer 30 and the recipient 10 exchange messages as indicated in FIG. 2. In summary, the recipient generates an identification value, performs an interactive protocol with the issuer while storing the relevant data in the storage, and discards most of the data while keeping sufficient data to regenerate the identification value. When retrieving the data, the identification value is regenerated, the interactive protocol is performed with the storage 20 rather than with the issuer 30 as indicated in FIG. 3, and the relevant data are stored in the recipient 10. The identification value and the initial value (seed) for regenerating the identification value may then be discarded. It will be understood that instead of a value for regenerating the identification value, the identification value itself may be temporarily stored.

In the following, it will be assumed that the data exchange between the issuer 30 and the recipient 10 takes place via the storage 20, i.e., all data pass through the storage 20. It will be understood that it is also possible for the issuer 30 and the recipient 10 to communicate directly and to copy the relevant exchanged data to the storage 20.

Reference will now be made to FIG. 4 in conjunction with FIG. 3. It is noted that in FIGS. 4 and 5 the recipient, storage and issuer are denoted by R, S and I respectively. In the method as depicted in FIG. 4, the generation of monetary data (such as electronic checks) is initiated in step 100, for instance by the recipient 10 sending a relevant request to the issuer 30. In step 101, the issuer (I) generates a commitment A associated with one or more groups of monetary data (electronic checks and/or coins). This commitment A may be produced by generating and using a suitable cryptographic function $F_1$ operating upon a random value W: $A=F_1(W)$. An example of a suitable function $F_1$ is discrete exponentiation modulo p with generator g of the order q, where q divides p−1 and where p and q are predetermined (prime) numbers: $A=F_1(W)=g^W$ mod p. The random value W may be predetermined or may be produced in step 101 using a random number generator.

The commitment A, by means of which the issuer commits himself to the monetary data, is sent to the recipient (R), in the present example via the storage (S) which stores the commitment A. The commitment A may be (temporarily) stored in the recipient as well.

In step 102, upon receiving the commitment A, the recipient generates an identification value C. This is for example a random number, generated on the basis of a seed X using a second (random) function $F_2$: $C=F_2(X)$. Optionally, the seed X is the result of combining a (fixed) base seed $X_0$ and an index Y. The index Y, which may have a considerably shorter length than the seed X, may e.g. indicate an entry in a table of seeds. Preferably, the index Y indicates how many times the function $F_2$ is to be applied, starting from the base seed $X_0$, to obtain the desired seed X. For example, if Y is equal to 3, the seed X may be obtained by applying the (random) function $F_2$ three times: $X=F_2(F_2(F_2(X_0)))$.

The seed X is stored in the recipient (R). If a base seed $X_0$ is used, this base seed is preferably permanently stored in the recipient, while the index Y may be stored in the recipient (R) or the storage (S).

Instead of storing the seed X or the index Y, it is also possible to store the value C. In practice, C will comprise more bits than Y and will thus require more storage space, making the storing of Y more economical.

Preferably, the relevant value (C, X or $X_0$) is stored in such a way so as to be directly linkable to a value A. That is, the storage may comprise a plurality of values A (e.g. each corresponding with a check), with a relevant value (C, X or $X_0$) being stored for each value A.

Subsequent to the computation of the identification value C, the recipient (R) generates a "fingerprint" E of the identification value C using a third function $F_3$: $E=F_3(C)$. Preferably, the fingerprint E also involves the value A: $E=F_3(C,A)$. The function $F_3$ may for example involve subjecting the combination of the identification value C and the commitment A to a so-called hash function H: $E=H(A,C)$. This fingerprint E, which identifies the identification value C but from which the value C cannot be derived, is sent to the issuer.

In step 103, the issuer (I) uses the received fingerprint E to produce a value B using a fourth function $F_4$: $B=F_4(E)$. Such a function involves, for example, multiplying the fingerprint E by a secret key $K_s$ modulo q and adding the result to the previously used random value W: $B=W+E\cdot K_s$ mod q. The value B thus derived is stored in the storage (S). The value B, which is the authenticating value of monetary data, may optionally be sent to the recipient (R), e.g. for verification purposes, but this is not essential.

It should be noted that the above scheme serves to produce data (e.g. checks) to which both the issuer and the recipient have contributed. The final value B is derived by the issuer from the value E, which is in turn derived by the recipient from the value A. As the value A was produced by the issuer, the values concerned are mutually linked.

In a first embodiment of the present invention, the value B is not passed on to the recipient (R) but stored in the storage (S) for later retrieval. In a second embodiment of the present invention, the value B is not only stored in the storage (S), but also sent to the recipient (R) for verification purposes. In the second embodiment, an additional step 104 (not shown in FIG. 4) is carried out in which additional data D may be derived from the values A, B, C and the public key $K_p$ associated with the secret key $K_s$. These data D, which are associated with the value B, provide additional information with respect to the monetary values concerned. The data D may further be verified using the same values, for example by verifying whether $F_5(A,B,E)=0$, where $D=(A,B,E)$, i.e. the combination of A, B and E (or C). In actual implementations, it may be verified whether $g^B=A\cdot K_p^E$ mod p. The seed X, or alternatively the identification value C, is stored by the recipient (R). Further data, including the data D and the values A, B and C (or E), may now be discarded, as the generation part of the method is completed.

FIG. 5 shows the reconstruction process carried out by the system of FIG. 3. The reconstruction process of the method of the present invention is initiated by the recipient (R) in step 110. In step 111 the commitment A is retrieved from the storage (S). If an index Y was used in step 102 to determine the seed X, this index Y is also retrieved. It should be noted that the storage should not contain both Y and $X_0$, or X, as that would allow the storage to produce monetary data without the involvement of the recipient.

In step 112, the identification value C is regenerated on the basis of the seed X. The fingerprint E of the identification value C is also regenerated, for example by subjecting the combination of the identification value C and the commitment A to a so-called hash function: $E=H(A,C)$. This fingerprint E, which identifies the identification value C but from which the value C cannot be derived, is sent to the storage S.

In step 113, the stored value B is retrieved. Optionally, the fingerprint E can be checked by verifying whether $F_5(A,B,E)=0$. In actual implementations, it may be verified whether $g^B=A\cdot K_p^E$ mod p. Subsequently, in step 114 the retrieved value B is used to regenerate the data D from A, B, C and the public key $K_p$ of the issuer I. The validity of the thus regenerated data D may further be verified using the same values, for example by verifying $g^R=A\cdot K_p^E$ mod p.

In the above method, data (e.g. D) are generated online and regenerated off-line. The method thus offers the possibility of regenerating data (D) without the need to involve the issuer. The issuer only "signs" the data (in a challenge-signed response exchange involving E and B) in the first phase. The method uses a controlled replay of the first phase to regenerate data in the second phase, where the recipient verifies the data. With the aid of the keys $K_s$ and $K_p$, a further protection of the data is achieved.

As the first (generation) phase may be considered to constitute an interrupted withdrawal of (e.g. monetary) data, which withdrawal is substantially repeated by the recipient in the second (reconstruction) phase, the recipient is capable of using identical protocols in both phases. As a result, there is no need for storing in the recipient additional code (software) for the second phase, thus effectively saving memory space.

In the above example, an electronic wallet has been shown as an example of an external storage device. The invention may also be used with other types of storage devices, such as another card or another terminal.

It will be understood by those skilled in the art that the embodiments described above are given by way of example only and that many modifications and additions are possible without departing from the scope of the present invention.

We claim:

1. A method of securely storing and retrieving data, the method comprising the steps of:

(a) generating a commitment (A) in a terminal;

(b) sending the commitment (A) from the terminal to an integrated circuit card and an electronic wallet;

(c) storing the commitment (A) in the electronic wallet;

(d) receiving the commitment (A) in the integrated circuit card;

(e) generating, in the integrated circuit card, an identification value (C) and a fingerprint (E) of the identification value (C) which identifies the identification value (C) but from which the identification value (C) cannot be derived;

(f) sending the fingerprint (E) from the integrated circuit card to the terminal;

(g) producing, in the terminal, an authenticating value (B) using the received fingerprint (E);

(h) storing the authenticating value (B) in the electronic wallet;

(i) retrieving, by the integrated circuit card, the commitment (A) from the electronic wallet;

(j) regenerating, in the integrated circuit card, the identification value (C) and the fingerprint (E) of the identification value (C);

(k) resending the fingerprint (E) from the integrated circuit card to the electronic wallet;

(l) verifying the fingerprint (E) in the electronic wallet; and (m) retrieving, by the integrated circuit card, the authenticating value (B) from the electronic wallet.

2. The method according to claim 1, wherein the identification value (C) is stored in the integrated circuit card.

3. The method according to claim 1, wherein the steps of generating and regenerating comprise generating and regenerating the identification value from a seed (X) stored in the integrated circuit card.

4. The method according to claim 3, further comprising the step of generating the seed (X) by combining a fixed base seed ($X_0$) and an index (Y), wherein the index (Y) indicates how many times a function is to be applied to the base seed ($X_0$).

5. The method according to claim 4, further comprising the step of discarding the identification value (C) in the integrated circuit card after the step (e) of generating.

6. The method according to claim 3, further comprising the step of discarding the identification value (C) in the integrated circuit card after the step (e) of generating.

7. The method according to claim 1, further comprising the step of discarding the commitment (A) and the authenticating value (B) in the integrated circuit card after the step of generating.

8. The method according to claim 1, wherein the step of generating comprises the step of producing the fingerprint (E) by subjecting both (1) the identification value (C) and (2) the commitment (A) to a function (H).

9. The method according to claim 1, wherein the step (g) of producing comprises the step of producing the authenticating value (B) using the fingerprint (E) and a secret key ($K_s$).

10. The method according to claim 1, wherein the steps (i) and (m) of retrieving comprise retrieving the commitment (A) and the authenticating value (B) to regenerate monetary data (D).

11. The method according to claim 10, wherein the step (l) of verifying comprises verifying the regenerated monetary data (D) using a public key ($K_p$) of the terminal.

12. The method according to claim 1, wherein the step of generating comprises the step of producing the fingerprint (E) by subjecting both (1) the identification value (C) and (2) the commitment (A) to a hash function (H).

13. The method as claimed in claim 1, wherein the steps (a)–(h) are performed in a first phase, and wherein steps (i)–(m) are performed in a second phase.

* * * * *